April 28, 1953 A. N. GOLDSMITH 2,636,936

TELEVISION SECRECY SYSTEM

Filed Sept. 10, 1946 2 SHEETS—SHEET 1

INVENTOR
ALFRED N. GOLDSMITH
BY H. S. Grover
ATTORNEY

INVENTOR
ALFRED N. GOLDSMITH
BY H. S. Grover.
ATTORNEY

Patented Apr. 28, 1953 2,636,936

UNITED STATES PATENT OFFICE 2,636,936

TELEVISION SECRECY SYSTEM

Alfred N. Goldsmith, New York, N. Y., assignor to Radio Corporation of America, New York, N. Y., a corporation of Delaware Application September 10, 1946, Serial No. 695,844

3 Claims. (Cl. 178—5.1)

Figure 1:
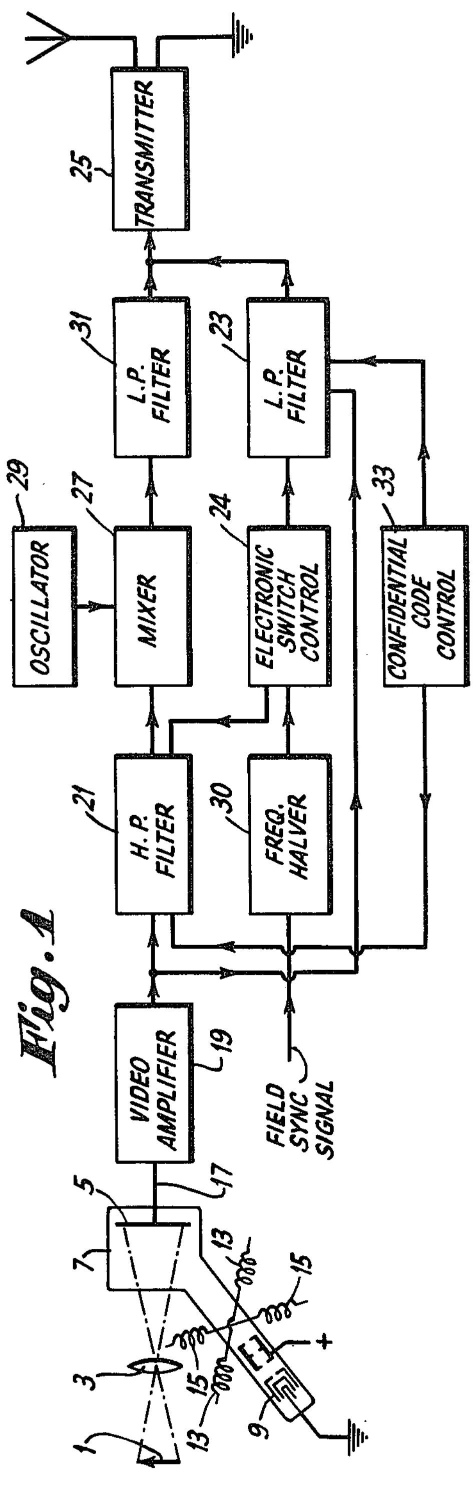

This invention relates to secret signalling and more particularly to a system and method for the secret transmission of television images.

Need for secrecy systems has been recognized from the earliest days of organized warfare. Privacy of intercommunication in military operations and the like has become of increasing importance. Further, it may become desirable or necessary to carry out commercial television broadcasting on a secrecy system requiring payment for the service by receiving set owners.

Theoretically, any cryptographic system except the one-time system can be broken down if enough time and skill are devoted to it, and if the volume of traffic is great enough to provide sufficient data. For all practical purposes, a cryptographic system is satisfactory if it provides a degree of security sufficient to delay the solution by the enemy for a length of time such that when the solution is finally reached, the information thus obtained has lost its value.

The science of cryptography may be broken down into two fundamental types of treatment of intelligence. The first is called transposition, wherein the elements or units of the intelligence retain their original identities and undergo some change in their relative positions or sequences so that the transmitted intelligence is not recognizable. The second is called substitution, wherein the elements maintain their original positions or sequences, but are replaced by other elements having different values or meanings. It is primarily of the first type to which this invention is directed.

The present invention in one of its preferred forms relates to an image transmitting system wherein an electrical signal representative of the image is subjected to the transposition type of cryptography prior to transmission.

An electrical signal is derived by scanning the image in any geometrical sequence. Any convenient sequence may be used so long as the same sequence is used in transmitter and receiver. For the purpose of illustration only, a television image scanning system of 441 lines with an aspect ratio of 4 to 3 will be described. Each image is scanned into a total of 441 rows or lines.

The fundamental image repetition rate in television systems has been set both in accordance with the rate necessary to provide persistence of vision without flicker and in accordance with the frequency of the power supply system to which the transmitter and receiver are connected. Since 60 cycles per second is common, the repetition rate has been set at 30 per second.

Two basic types of scanning have been proposed. One is the sequential line transmission and the other has become known as the interlaced line transmission system.

In the sequential line system, the complete image is transmitted during each series of scanning paths in one direction, and the transmission is repeated at a predetermined rate or 30 times per second. The flicker obtained by completely scanning the image during each scanning sequence is objectionable, and accordingly the method of transmission of frame frequencies in the order of 30 per second has, by common consent among the experts in the television field, been substantially discarded from commercialization. The result is that the second system, known as the interlaced line system of transmission, has been adopted both in the United States and Europe.

Interlaced scanning is a system of transmitting images which consists of first transmitting the odd numbered lines, such as the first, third, fifth, seventh, etc., the even numbered lines being omitted. After one-half or 220½ lines have been send, the end of the first "field" or set of alternate lines is reached. The scanning process then begins again and the even numbered lines, such as the second, fourth, sixth, etc., are then transmitted. These lines fall into the spaces between the odd numbered lines previously transmitted. The entire process of transmitting both the odd numbered and even numbered lines occupies a time of 1/30 second, and consequently 30 complete images or "frames" are sent each second. This practice is shown more particularly by U. S. Patents Nos. 2,152,234 and 2,178,218, granted on March 28, 1939 and October 31, 1939, to R. C. Ballard and A. V. Bedford, all respectively.

With this system of interlaced line transmission there will be transmitted each second 60 fields or half images where the frequency of the power line is 60 cycles per second.

In the system of interlaced scanning, the detail along the lines is the same as that which is provided by sequential scanning, with the result that each of the separate image fields scanned has full detail in a horizontal direction, but in view of the fact that alternate fields include only one-half of the total number of lines in the vertical direction, each field has half detail in a vertical direction. It will be remembered, however, that 60 complete image fields are transmitted each second, and therefore the frequency band required for the transmission by the interlaced line method is the same as that for the sequential line transmission.

If the picture is to have the same degree of resolution in the horizontal direction as in the vertical direction, then each line in the image must be capable of division into about 588 picture elements. Since 13,230 lines are sent in each second, this results in 7,779,240 picture elements per second.

A large amount of information relating to interlaced scanning has been published. One such publication is found in the "Proceedings of the Institute of Radio Engineers," volume 24, for April 1936, page 559, and entitled "Scanning Sequence and Repetition Rate of Television Images," by Messers Kell, Bedford, and Trainer.

There is a system of interlaced scanning to which the present invention is particularly adapted. The system is shown and described in the U. S. patent to Goldsmith, No. 2,236,502, dated April 1, 1941.

According to the system outlined in Goldsmith U. S. Patent No. 2,236,502, there are sent each second 60 partial delineation images which form in their totality the equivalent of 30 fully delineated images. This is accomplished by passing the signals representative of the odd scanning line images through a filtering system or its equivalent such that only the components varying in frequency between 0 and 3.7 mc. pass to the transmitter modulator. Thus, for the partial image or "low frequency image" there is sent out a signal occupying no more than 3.7 mc. This image corresponds to the coarser delineation and the slower movements of the sequence which is being scanned, but it will be appreciated that the high frequency details will unquestionably be missing from this image.

Lines representative of the even scanning line images may supply the "high frequency image." The high frequency image produces a 7.5 mc. band of frequencies, but due to the fact that the low frequency components of the image are already taken care of by the odd line scanning image, the low frequency components may be eliminated by passing the signal obtained from the even line scanning or the high frequency image through a filter which is adapted to pass only those frequencies between 3.7 mc. and 7.5 mc.

It is not necessary to transmit the band of frequencies between 3.7 and 7.5 mc. because those signals can be transmitted during the time interval occupied by even line scannings as a band of frequencies between 0 and 3.7 mc. by suitably heterodyning a beat note of 7.5 mc. with the band of frequencies between 3.7 and 7.5 mc. The resulting frequency band will have a range between 0 and 3.7 mc.

It will be seen that in order to reproduce this image at the receiving station, it is necessary to provide a beat note oscillator to reconstruct the frequency band between 3.7 mc. and 7.5 mc. If such an oscillator is not provided, the image reconstructed will convey little or no intelligence. This in itself may be considered to have a certain degree of security because if the enemy did not have in its television receiving system the proper beat note oscillator, an image could not be constructed from the received signals.

According to this invention, further security is provided by changing the frequency bands in accordance with a predetermined confidential code in order that the reconstruction of the transmitted images could not be accomplished without a knowledge of the confidential code.

The primary object of this invention is to provide an improved secrecy signal transmission system.

Another object of this invention is to provide a method and means for the transmission of television images having a certain degree of security.

Figure 2:
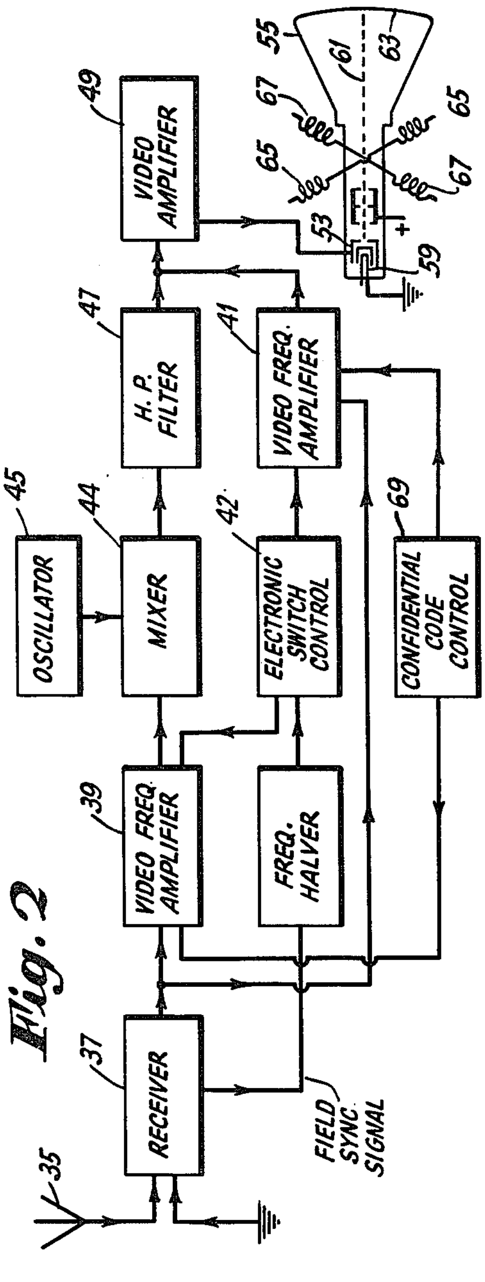
Figures 3A, 3B, 4, 5:
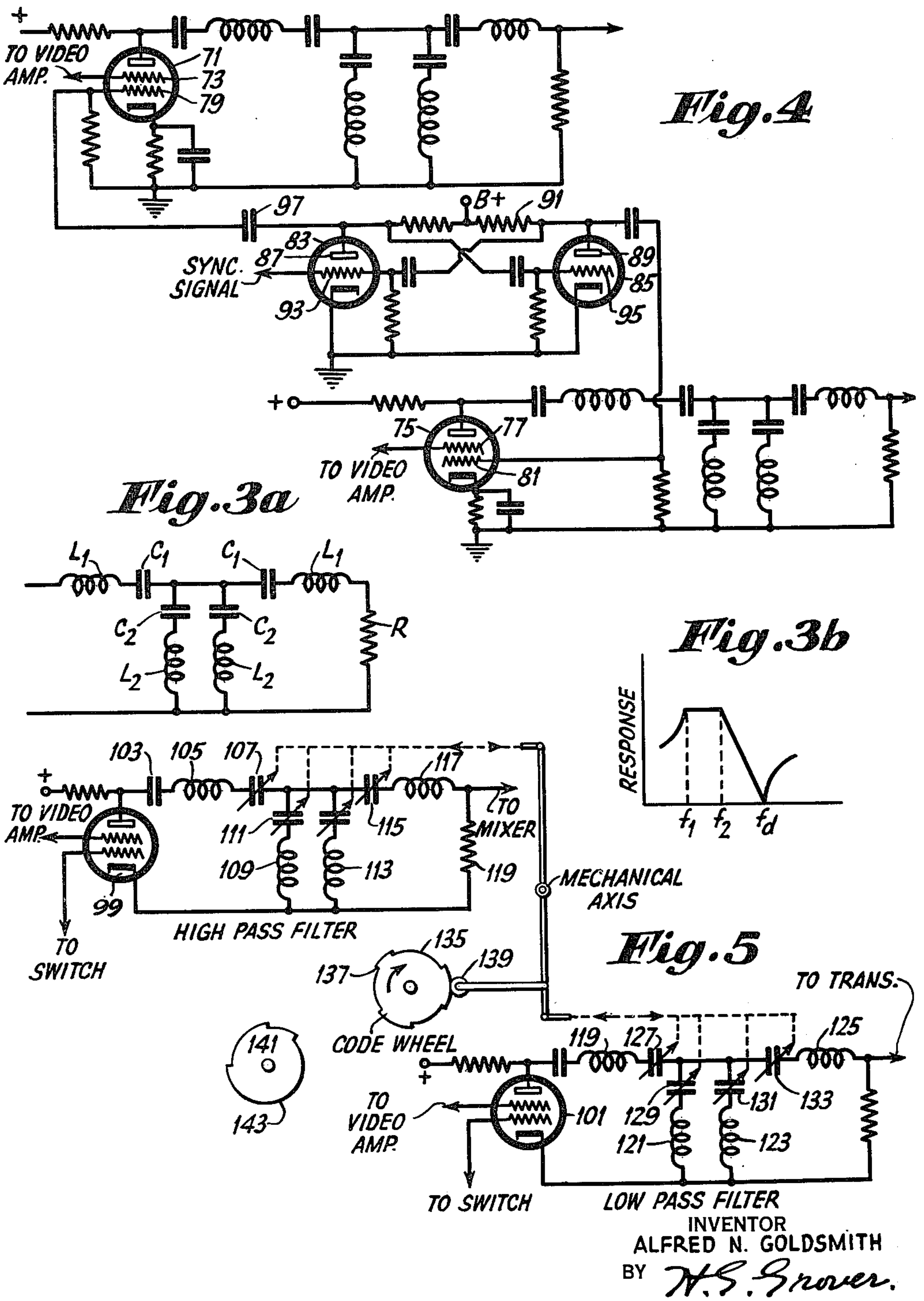

Other and incidental objects of the invention will be apparent to those skilled in the art from a reading of the following specification and an inspection of the accompanying drawing in which Figure 1 shows in block diagram a preferred form of the transmitter portion of the system involved in this invention, Figure 2 shows in block diagram a preferred form of the receiver portion of the system involved in this invention, Figure 3*a* and Figure 3*b* illustrate by circuit diagram and graph the operation of one element which may be employed in the practice of this invention, Figure 4 shows by circuit diagram in detail this invention in one of its preferred forms, and Figure 5 shows by circuit diagram one form of this invention.

Referring now to Figure 1 in more detail, the image signals are developed by way of an electron image scanning tube of any suitable form such as, for example, that described by Dr. V. K. Zworykin in an article entitled "The iconoscope," commencing on page 16 of volume 22, Number 1, "Proceedings of the Institute of Radio Engineers" for January 1934, and particularly to the general form of the apparatus shown and described commencing on page 24 of the said publication. The transmitted image signals are also assumed herein to be produced by electronic means such as a cathode ray tube, and such a tube, for example, may be the general form described by Dr. Zworykin in the "Proceedings of the Institute of Radio Engineers," volume 21, Number 12, for December 1933, in an article entitled "Description of an experimental television system and kinescope," starting on page 1655 of this publication.

As is well known in the art, transmissions may originate by virtue of image pick-up by the image scanning or camera tube, but direct pick-up of the image signals may originate by virtue of scanning printed or pictorial subject matter on motion picture films.

The subject 1, which may be a film or other object of which the electro-optical reproduction is desired at receiving points, is projected by a suitable optical system 3 on to the light responsive mosaic electrode 5 of the image scanning tube 7. In one end of the image scanning tube 7, there is provided an electron gun 9 of known form from which an electron scanning beam 11 is adapted to be projected so as to strike the illuminated side of the mosaic electrode 5 in order that the electrical replica of the subject produced upon the mosaic electrode may be scanned. Scanning is accomplished by virtue of the application of suitable deflecting currents passing through the deflecting coils 13 and 15. Such currents for deflecting the cathode ray beam 11 across the illuminated side of the mosaic electrode 5 are, according to the usual practice, of such wave form that a sawtooth of current is forced through the deflecting coils so that the beam of the cathode ray 11 is moved relatively slowly across the mosaic electrode in one scanning direction and returned rapidly, say for line scanning, while the other component of motion is also accomplished slowly with a rapid return so that two dimensional objects may be scanned.

The mosaic electrode 5 usually comprises a signal plate carrying suitably arranged light responsive particles or elements supported upon an insulating element which is in turn carried by the signal plate. There is no measurable lateral conductivity between the multiplicity of minute size photoelectrically responsive particles. Therefore, in accordance with the intensity of the light of the subject 1 striking the mosaic electrode, various charges are accumulated and held between the photoelectrical elements and the signal plate. Scanning by the cathode ray beam 11 causes these charges to be released to an external circuit by way of conductor 17 connected to the mosaic electrode 5. The conductor 17 supplies its energy to the input circuit of a video frequency amplifier 19 whose output signal is supplied to one signal utilization circuit having high pass filter 21 and another signal utilization circuit having a low pass filter 23.

Any signal energy entering the low pass filter 23 which is of a frequency higher than the upper frequency limit to which low pass filter 23 is responsive, as, for example, 3.7 mc. will be attenuated. All frequencies varying between 0 and 3.7 mc. or the upper frequency limit to which low pass filter 23 is responsive will be passed through filter 23 to the transmitter 25. Similarly, for alternate image fields where the finely delineated portion of the image is to be transmitted, it is apparent from what has been above stated that all frequencies varying between 0 and 3.7 mc. will be attenuated. Accordingly, energy entering high pass filter 21 which is of a frequency higher than the assumed dividing value of 3.7 mc. and herein assumed to vary as high as 7.5 mc. will be passed through the high pass filter 21 to enter the mixer 27. The controlling energy is heterodyned in mixer 27 with the frequency of a local oscillator 29, whose oscillation frequency may be of a value equal to the high frequency limit of the high frequency band pass filter 21 or 7.5 mc. Thus by the heterodyning effect, the output from the mixer 27 will occupy a frequency wave band equivalent to that being passed by the low pass filter 23. A low pass filter 31 is therefore provided, the output of which is also fed to transmitter 25.

The high and low pass filters 21, 23, and 31 may take any convenient form, but for the purpose of illustration of this invention, there is shown in detail in Figure 3 an *m*-derived band pass filter which is explained below. These filters should be so designed as to avoid or minimize phase distortion.

It follows that the high frequency components of the subject 1 will pass through the signal channel including high pass filter 21 and the low frequency components of the signal representative of subject 1 will pass through the channel including low pass filter 23.

It is apparent that if all frequencies between 0 and 3.7 mc. are stopped or attenuated by the filter 23 and frequencies between 3.7 mc. and 7.5 mc. are converted to frequencies in the frequency band between 0 and 3.7 mc., the total band width entering the transmitter 25 will not exceed 3.7 mc. It will be seen that each group of signals must be sent separately in order that the original signal train may be reconstructed at the receiver. This may be accomplished by means of a switch operating electronically or mechanically. For the purpose of explanation, an electronic switch will be shown and described.

The electronic switch control 24 may be adjusted, for example, such that filter 23 is operative only during the scanning of the odd line fields, and high pass filter 21 is operative only during the scanning of the even line fields. The electronic switch control 24 may receive its control from a field synchronizing signal obtained from the scanning signal generator used to produce the cathode ray deflection voltages. A frequency halver 30 may be included to provide the required half frequency necessary to excite the electronic switch control 24.

Such switching action may also be accomplished, for example, by an electronic switch of the type already described in the Roys and Mayer patent of August 10, 1937, No. 2,089,430, the C. C. Schumard Patent No. Re. 22,672 of August 28, 1945, or the H. M. Strobel Patent No. 1,757,345 of May 6, 1930, or by a mechanical switching means. An electronic switching device is shown in more detail in Figure 4.

If the groups of signals passing through their responsive channels are changed in a predetermined manner or at a predetermined rate, the signal transmitted by transmitter 25 will be unintelligible unless the signal train is reconstructed in its original order at the receiving station. By controlling high pass filter 21 and low pass filter 23 with confidential code control 33 such that the high pass filter 21 and the low pass filter 23 are changed in accordance with a prearranged confidential code, a signal is transmitted by transmitter 25 which is unintelligible to anyone not having a similar confidential code control. One preferred form of confidential code control 33 is shown and described in more detail below in Figures 4 and 5.

Referring now to Figure 2, there is shown in a preferred form a method and system for reconstructing the original image from the signals transmitted in accordance with this invention. The radio signals are received on antenna 35 to pass to receiver 37. This radio receiver may take the form of the general type disclosed by U. S. reissue patent, Carlson No. Re. 20,700, dated April 19, 1938, where it is desired, for example, to receive simultaneously all of the video, audio, and control signals in a single receiver circuit and wherein, through the use of a suitable oscillator, video and audio signals with the desired control signals accompanying the video signals result in the production of a plurality of separate intermediate frequencies which may be independently amplified. This complete arrangement has not herein been shown for the reason of a desire for simplification of operation, although it is to be understood that reference to the Carlson patent, for example, is made for a full and complete disclosure of this portion of the system, as well as suitable automatic volume control arrangements.

The output signal from receiver 37 is passed on to video frequency amplifier 39 and video frequency amplifier 41.

The control exercised by electronic switch control 42 is similar to the control exercised by electronic switch control 24 in the transmitter shown in Figure 1. Electronic switch control 42 causes a video frequency amplifier 39 to pass signals only during even line frame scannings, and video frequency amplifier 41 is made operative only during odd line image field scanning operations. Synchronizing control for electronic switch 42 can be obtained by utilizing the received frame synchronizing signal and passing it through a frequency halver 43.

The signal output of video frequency amplifier 39 is transmitted to mixer 44, to which is also fed the signal output of oscillator 45. In order to properly reconstruct the image 1 at the receiver, it is necessary that the frequency of the heterodyning oscillator 45 in the receiver be the same as the frequency of the heterodyning oscillator 29 in the transmitter. By combining the signal from video frequency amplifier 39 with the oscillator 45 in mixer 44, there is obtained a band of frequencies which ranges from 3.7 mc. or the dividing point of the high and low frequency band to 7.5 m. or the upper frequency limit of the original video signals. This band of frequencies is passed to high pass filter 47.

The signals from the receiver 37 also pass to video frequency amplifier 41. The control exercised on video frequency amplifier 39 and video frequency amplifier 41 by electronic switch 42 establishes the necessary timing for the reconstruction of the signal train.

The video frequency amplifier 39, being operative only during the transmission of odd image fields, amplifies only those signals which are received during the scanning of the even image fields, while during this period video frequency amplifier 41 is inoperative or biased to cut-off, so that it cannot pass any of the received signals. Consequently, image or video signals representing the even image fields or high frequency components of the image, after having been amplified in amplifier 39, are passed to mixer 44 for conversion. The output of the mixer 44 is then passed through the high pass filter 47 to the video amplifier 49.

Image or video signals representing the odd image fields or low frequency components of the image are passed through the video frequency amplifier 41 and directly to the video amplifier 49.

It should be understood that the mode of alternately activating amplifiers 39 and 41 by the electronic switch control 51 is illustrative, and that any equivalent controllably timed system of activating these amplifiers alternately may be used.

The signal obtained from video amplifier 49 is supplied to the control electrode 53 of the cathode ray tube 55. Within the cathode ray tube 55 there is provided the combination of anode 57 and cathode 59 which, together with the control electrode 53, form an electron gun which, when suitable energies are applied in a manner which is known in the art, causes a cathode ray beam 61 to be developed. This cathode ray beam 61 impinges upon the target or luminescent screen 63 of the tube 55 and causes the production of electro-optical image effects whose spatial position is controlled by means of the deflecting coil combination 65 and 67.

All signal outputs from the video amplifier 49, when supplied to the control electrode 53, cause a control in the intensity of the cathode ray beam 61 so that the intensity of the resultant luminous effects produced on the target or luminescent screen 63 is obtained. The spatial position of the cathode ray beam 61 as it impinges upon the target 63 is controlled in synchronism with the motion of the cathode ray beam 11 of the transmitter tube 7 shown in Figure 1, and the currents which now flow through the deflection coils 65 and 67 correspond in phase and frequency to the currents flowing through the deflecting windings 13 and 15 of the transmitting tube 7. The manner of transmitting and producing these deflecting currents per se forms no part of the present invention and accordingly, reference is made for a complete understanding of what has herein been disclosed to the discussion of "Deflection of focused electron beams," beginning on page 129 of the book entitled "Principles of Television Engineering" by Donald G. Fink, and published in 1940 by the McGraw Hill Book Co. The arrangements for separating the synchronizing signals and for developing the control energy therefor have been explained in the citation above mentioned, and therefore have been omitted from this disclosure for the sake of simplicity.

In order to reconstruct the original image, it is necessary to reconstruct the train of image signals in their original order, that is, before they were garbled by the application of the signal of the confidential code control 33 to the low pass filters 21 and 23 of Figure 1. This may be accomplished by applying to video frequency amplifiers 39 and 41 of the receiver a signal of confidential code control 69. Control 69 is similar in form to confidential code control 33 of the transmitter.

Referring now to Figure 3a and Figure 3b, there is shown in detail one filter circuit which may be employed in the practice of this invention. A simple band pass filter is shown. The filter consists of four tuned circuits and a terminating resistor. The inductance and capacity values of each tuned circuit are determined by the value of the terminating resistor and by the frequency limits of the desired pass band, as well as by a frequency outside the pass band at which very great attenuation is desired. This latter frequency may be the frequency corresponding to one of the undesired audio carriers, or that accompanying the video signal or that in adjacent channel.

The relationships determined by the inductance, capacity and resistance values are based on the lower frequency limit of the pass band $f_1$, the upper frequency limit $f_2$, and the rejection frequency $f_a$. First two ratios are derived from the frequencies $$M_1=\sqrt{\frac{1-(f_2/f_a)^2}{1-(f_1/f_a)^2}}$$

$$M_2=M_1\left(\frac{f_1}{f_2}\right)$$

where $M_1$ represents a first reference ratio and $M_2$ represents a second reference ratio.

The inductance $L_1$ and the capacitance $C_1$ (the same values in both series tuned circuits) are given by the following:

$$L_1=\frac{Rm_1}{\pi(f_2-f_1)}$$

$$C_1=\frac{(f_2-f_1)}{2\pi R f_1 f_2 m_2}$$

and $$L_2=\frac{(1-m_1^2)L_1}{4m_1^2}$$

$$C_2=\frac{4m_2^2C_1}{(1-m_2^2)}$$

where the added designation R represents the terminating resistor (see Figure 3a).

Turning now to Figure 4, there is shown in detail an electronic switching device which may be employed in the practice of this invention.

The switching device is shown in connection with a filter circuit suitable for use in the practice of this invention as, for example, that form shown in Figure 1 and Figure 3*a*. The switching arrangement is equally adaptable to the receiving system shown in Figure 2. Video frequency amplifiers such as required in the receiving system shown in Figure 2 may be substituted for the filters shown in Figure 4.

A mixer tube 71 contains a control electrode 73, which is connected to a video amplifier such as shown as 19 in Figure 1. Similarly, tube 75 contains control electrode 77, which is also connected to the same video amplifier to which tube 71 is connected. The operation of tubes 71 and 75 may be controlled by applying to their respective control electrodes 79 and 81 a biasing potential which will cause them to be operative, alternately. This function can be performed, for example, with a trigger circuit containing tubes 83 and 85.

A trigger circuit is a relaxation oscillator which may be designated as continuous or free-running or as driven oscillators whose operation and frequency are controlled by a synchronizing or trigger voltage applied from an outside source. For the purpose of illustration, a synchronizing signal will be employed.

The form of trigger circuit illustrated is not an oscillator in the true sense; rather it is a circuit possessing two conditions of stable equilibrium. One condition is when one tube is conducting and the other cut off, and the other condition is when the other tube is conducting and the first tube is cut off. The circuit remains in either one or the other of these two conditions with no change in anode control electrode or cathode potential or anode current until action occurs which causes the non-conducting tube to conduct. The tubes then reverse their functions and remain in the new condition as long as no plate current flows in the cut-off tube. Because of this sudden reversal or "flopping" from one state of equilibrium to the other, this type of circuit is often referred to as a "flip flop" circuit.

To analyze further the operation of the switching circuit shown in Figure 4, assume that the anode voltage B+ is suddenly applied to the anodes 87 and 89 of tubes 83 and 85 respectively. If both tubes and their corresponding circuit elements were exactly alike, equal currents would flow through the anode circuits. It is inconceivable, however, that two tubes and their circuit elements could be balanced so exactly as to permit this to occur. One tube will start to conduct an instant before the other. Assume for the purpose of explanation of this investigation that tube 85 conducts sooner than tube 83. When conduction begins, tube 85 in drawing current will produce a voltage drop across anode resistor 91. The result is a drop in potential of anode 89 of tube 85, which is carried to control electrode 93 of tube 83. This drop in potential of control electrode 93 will prevent tube 83 from conducting current. In addition to producing a drop in potential of control electrode 93, the drop in potential is also transmitted to control electrodes 81 of tube 75. This drop in potential of control electrode 81 of tube 75 may be such as to prevent tube 75 from passing current. Such action will block the flow of signals through tube 75.

In this condition, the trigger circuit employing tubes 83 and 85 are in stable equilibrium with tube 83 at cut-off and tube 85 conducting. The circuit will remain in this condition until the non-conducting tube 83 is made to conduct by the application of a trigger voltage to control electrode 93. The trigger voltage may take the form of a field synchronizing signal passed through the frequency halver 30 or 43 to produce a pulse recurring 30 times per second. The pulse will be applied to control electrode 93. When a positive pulse is applied to control electrode 93 of tube 83, it will remove the high negative potential on the control electrode momentarily. The current then flows in the anode circuit of tube 83 and the voltage of its anode 87 drops. This decrease in potential is impressed on the control electrode 95 of tube 85. The current through the anode resistor 91 then decreases, and the potential of anode 89 rises. This rise in potential is passed on to the control electrode 93 of tube 83, causing a still further increase in its anode current. This action continues until tube 83 is conducting heavy current and tube 85 is cut off. When the tube 85 is cut off, its anode potential is high, thus resulting in an increase in potential on control electrode 81 of tube 75, which will in turn permit tube 85 to pass current through its respective channel.

Control electrode 79 of tube 71 is connected to anode 87 of tube 83 through capacity 97. It will be seen that the control electrode 79 of tube 71 will receive a control signal whose amplitude is inverse to that control signal impressed on control electrode 81 of tube 75. It will therefore be seen that tubes 71 and 75 conduct alternately at a frequency dependent upon the frequency of the trigger circuit including tubes 83 and 85.

The frequency may be dependent upon the frame synchronizing signal, although multivibrators of this type can be synchronized with a sine wave voltage or trigger pulses of any frequency. The pulses may be either positive or negative. A multivibrator may also be made to synchronize to a sub-multiple of the trigger frequency, for example, one pulse of a series of pulses causes switching of the multivibrator, but the following pulses may be made to have no effect since they are either applied to a conducting tube or are applied to a non-conducting tube, but of insufficient amplitude to start conduction, by reason of the fact that, before the negative bias of the non-conducting tube was leaked off sufficiently, the amplitude of the added pulse cannot yet raise the bias potential above the bias required to fire the tube.

In the present illustration, it is desired to cause the multivibrator, including tubes 83 and 85, to switch tubes 71 and tubes 75 at a frequency such as to cause the video signals representative of one frame to pass through the channel including tube 71 and the succeeding frame to pass through the channel including tube 75.

Turning now to Figure 5, there is shown one method and means for providing a change in groups of the signal train representative of the image being transmitted in order to provide groups of electrical signals of predetermined irregularity. For the purpose of illustration, let it be assumed that tube 99 is contained in one channel of the transmitting system, such as that channel including high pass filter 21, and tube 101 is contained in the channel including low pass filter 23 of Figure 1. Tube 99 is connected to the high pass filter through coupling condenser 103.

The high pass filter contains inductance 105, capacity 107, inductance 109, capacity 111, inductance 113, capacity 115, and inductance 117. Resistor 119 is also included in the high pass filter circuit in a manner shown and described in Figure 3*a*.

A similar filter network is provided in a channel including tube 101, such as, for example, the channel in the transmitting circuit illustrated in Figure 1, containing low pass filter 23. This filter circuit may also be constructed in accordance with the filter circuit illustrated in Figure 3*a*. The low pass filter circuit includes inductances 119, 121, 123, and 125. The low pass filter also includes condensers 127, 129, 131, and 133.

A mechanical device may be used to change the characteristics of the filter circuits by mechanically coupling a code wheel 135 to the condenser in such a manner that the capacity of the condensers in each of the filter circuits may be varied in accordance with a predetermined irregular schedule. For the purpose of illustration, this is accomplished by providing code wheel 135 with a number of teeth of irregular width, such as 137. A follower 139 rides on the code wheel 135 such that its relative position is dependent upon the position of the teeth 137 of the code wheel 135. The code wheel 135 may revolve at a predetermined speed which may or may not be uniform.

A lever connects follower 139 with each of the condensers of both filter circuits in such a manner that their capacity will be changed between two predetermined values each time follower 139 is moved by one of the teeth 137 on the code wheel 135. Such a device can provide changes in the width of the signal pass band. It can also provide a change in the position of the signal pass band.

By providing a code wheel such as 141 having gradually sloping teeth of irregular distribution, the frequency bands transmitted by the filter circuits can be made to shift gradually in position.

In another form of this invention, the time duration of the individual groups of signals may be changed by the proper control, according to a prearranged time schedule, of the electronic switching means illustrated in Figure 4. A further degree of security may be obtained by combining any of the changes referred to above.

It will be understood that the various series of decoding operation herein described at the receiving location are conducted, for proper decoding, in synchronism with the corresponding coding operations at the transmitting location. Such synchronism may be achieved by any conventional means such as the use of synchronized clocks and switching mechanisms, or by the transmission and reception of appropriate synchronizing datum signals. Since such means do not form a part of this invention, they accordingly need not be further considered.

Having now described the invention, I claim:

1. A system for the transmission of television signals comprising in combination means for repeatedly scanning a complete field of view at a predetermined cyclically recurring scanning sequence rate so as to produce for each scanning of the complete field electrical signals of selected maximum frequency range, means for deriving from the signals resulting from the scannings of the complete field of view groups of electrical signals representative of different frequency ranges of the complete field within the selected maximum frequency range, each group representing a single field and the different groups recurring in regular sequence, frequency range control means connected to said deriving means, means for changing the rate of change of said frequency range control means, a source of irregular control signals, and a control connection between said frequency range control means and said source of control signals.

2. A system for the transmission of television signals comprising in combination means for repeatedly scanning a complete field of view at a predetermined cyclically recurring scanning sequence rate so as to produce for each scanning of the complete field electrical signals of selected maximum delineatory range, a plurality of signal transmission circuits alternately operative, each connected to said aforementioned means and each including a band pass filter to divide between said circuits the electrical signals into groups of electrical signals representative of different selected delineatory ranges of the complete field within the selected maximum delineatory range and means including a mechanically changeable capacity to change the width of said selected delineatory ranges in accordance with a prearranged code of irregular sequence.

3. A system for the transmission of television signals comprising in combination means for repeatedly scanning a complete field of view at a predetermined cyclically recurring scanning sequence rate so as to produce for each scanning of the complete field electrical signals of selected maximum delineatory range, a plurality of intermittently operative signal transmission circuits, each connected to said aforementioned means and each including a band pass filter to divide between said circuits all the electrical signals into signal groups representative of different selected delineatory ranges of the complete field within the selected maximum delineatory range, and synchronously driven means to change said band pass filters in an irregular coded sequence.

ALFRED N. GOLDSMITH.

References Cited in the file of this patent

UNITED STATES PATENTS

| Number | Name | Date |
|---|---|---|
| 1,571,005 | Hartley | June 26, 1926 |
| 1,769,918 | Gray | July 8, 1930 |
| 1,769,920 | Gray | July 8, 1930 |
| 2,236,502 | Goldsmith | Apr. 1, 1941 |
| 2,251,525 | Rosenthal | Aug. 5, 1941 |
| 2,402,058 | Loughren | June 11, 1946 |
| 2,402,067 | Mathes | June 11, 1946 |
| 2,407,259 | Dickieson | Sept. 10, 1946 |
| 2,408,692 | Shore | Oct. 1, 1946 |
| 2,414,101 | Hogan | Jan. 14, 1947 |
| 2,419,568 | Labin | Apr. 29, 1947 |

FOREIGN PATENTS

| Number | Country | Date |
|---|---|---|
| 560,925 | Great Britain | Mar. 27, 1944 |

OTHER REFERENCES

Ser. No. 251,004, Valensi (A. P. C.), published July 13, 1943.